United States Patent

Nomura et al.

[11] Patent Number: 5,621,838
[45] Date of Patent: Apr. 15, 1997

[54] RESINS FOR COATED OPTICAL FIBER UNITS

[75] Inventors: Kaori Nomura; Tomoyuki Hattori; Tsuyoshi Nonaka; Nobuhiro Akasaka, all of Yokohama, Japan

[73] Assignee: Sumitomo Electric Industries, Ltd., Osaka, Japan

[21] Appl. No.: 493,520

[22] Filed: Jun. 22, 1995

Related U.S. Application Data

[63] Continuation of Ser. No. 204,998, Mar. 3, 1994, abandoned.

[30] Foreign Application Priority Data

Mar. 4, 1993 [JP] Japan .................................. 5-067316

[51] Int. Cl.$^6$ ........................................................ G02B 6/44
[52] U.S. Cl. ............................ 385/100; 385/114; 385/103
[58] Field of Search ............................ 385/100–114, 126, 385/128

[56] References Cited

U.S. PATENT DOCUMENTS 4,900,126  2/1990  Jackson et al. .......................... 385/114
4,953,945  9/1990  Nishimura et al. .................. 350/96.23

FOREIGN PATENT DOCUMENTS 0262340   4/1988   European Pat. Off. .
0418829   3/1991   European Pat. Off. .
63-281109 11/1988  Japan .
1113711   5/1989   Japan .
457814    2/1992   Japan .

OTHER PUBLICATIONS

Patent Abstracts of Japan, vol. 7, No. 198 (P–220), 2 Sep. 1983, JP–A–58 098 707 11 Jun. 1983.
Patent Abstracts of Japan, vol. 14, No. 223 (P–1046), 11 May 1990, JP–A–02 051 108, 21 Feb. 1990.

*Primary Examiner*—John Ngo
*Attorney, Agent, or Firm*—Cushman Darby & Cushman, IP Group of Pillsbury Madison & Sutro, LLP

[57] ABSTRACT

A coated optical fiber unit having at least two coated optical fibers, each of which has a coloring layer as the outermost layer and which are coated together with a bundling coating layer, is disclosed. The bundling coating layer and the coloring layer are both treated to suppress their bonding, there by allowing the coloring layer to not be removed at the same time as the removal of the bundling coating layer. The releasing agent added to the bundling coating layer and the coloring layer does not swell the resins in the layers, or cause peeling of the protective coating layer from the optical fiber.

9 Claims, 1 Drawing Sheet

RESINS FOR COATED OPTICAL FIBER UNITS

This is a continuation of application Ser. No. 08/204,998, filed on Mar. 3, 1994, which was abandoned upon the filing hereof.

BACKGROUND OF THE INVENTION

1. Field of the Invention

The present invention relates to a coated optical fiber unit comprising at least two fibers which are coated together with a bundling coating layer, and each of which has a protective coating layer around an optical fiber. In particular, the present invention relates to an improvement to a resin of a bundling coating layer and a coloring layer.

2. Description of the Related Art

Since an optical glass fiber to be used as an optical transmission medium (hereinafter referred to as "optical fiber") has a diameter of 150 μm or less usually, and is made of a fragile material, namely glass, its surface tends to be easily flawed during its production or cable assembling, or storage. Further, the stress is concentrated on the flawed part so that the optical fiber is easily broken when an external force is applied thereon.

Since it is very difficult to use such an optical fiber as an optical transmission medium, the surface of optical fiber is coated with a resin just after production make the optical fiber suitable and to be worthy for long term use. The coated optical fiber is practically used.

Examples of the conventionally used resinous coating material are thermosetting resins (e.g. silicone resin, epoxy resin, urethane resin, etc.), actinic ray (UV light)-curable resins (e.g. polyepoxy acrylate, polyurethane acrylate, polyester acrylate, etc.), and the like. Since these materials are organic materials, it is known that these materials suffer from denaturation such as oxidation, or deterioration. To prevent denaturation, they are treated to suppress the generation of hydrogen gas ($H_2$), as disclosed in Japanese Patent KOKAI Publication No. 113711/1989.

To improve the handling easiness and a density of the optical fibers, a coated optical fiber unit in which two or more coated optical fibers are coated together with a bundling coating layer has been used.

When the single optical fiber of the coated optical fiber unit is fusion connected with an optical fiber, with a single optical fiber of another coated optical fiber unit, or with a connector, an end part of the bundling coating resin should be removed to separate the single optical fibers. Each coated optical fiber has a coloring layer around the protective coating layer to identify each optical fiber when it is separated as described above.

When a bond strength between the bundling coating resin and the coloring layer is larger than that between the coloring layer and the protective coating layer, the coloring layer is removed when the bundling protective resin is removed. Consequently the respective optical fiber may not be identifiable.

To solve such problem, Japanese Patent KOKAI Publication Nos. 281109/1988 and 57814/1992 disclose either treating the bundling coating resin or the coloring layer to suppress bonding, whereby the bond strength between the bundling coating resin and the coloring layer is decreased.

However, to decrease the bond strength by the above treatment for suppressing bonding, a releasing agent should be added to the resin or the coloring layer at a high concentration. If the releasing agent is added at a high concentration, it will cause various problems, since it is a low molecular compound and easily moves in the bundling coating layer, coloring layer and protective coating layer which are made of polymers.

When the releasing agent migrates to the inner resin of the coloring layer, the resin swells until causing the resin layer to crack. When the releasing agent migrates to an interface between the optical fiber and the protective coating layer, a part of the protective layer is peeled off from the optical fiber, and the releasing agent which is accumulated between the protective coating layer and the optical fiber generates uneven stress on the optical fiber, which may increase transmission loss.

When the releasing agent migrates onto the surface of the bundling coating layer, the surface of the bundling coating resin becomes sticky so that the handling property of the unit is deteriorated. In addition, the releasing agent aggregates to cause phase separation in the resin.

The bonding between the bundling coating layer and the coloring layer is achieved because the surfaces of the bundling coating resin and the coloring layer are adhesion active physically (e.g. unevenness) or chemically (e.g., the presence of functional groups which form a hydrogen bond).

The above treatment for suppressing bonding is aimed to make either the bundling coating layer surface or the coloring layer surface adhesion inactive. Since the resin of the other layer is still adhesion active on its surface in the above treatment, the releasing agent should be added to one resin in a very high concentration such that the surface of the other resin is made adhesion inactive, so that the bonding is suppressed by the addition of the releasing agent. Otherwise, no effect is obtained.

SUMMARY OF THE INVENTION

An object of the present invention is to provide a coated optical fiber unit in which at least two coated optical fibers each of which has a coloring layer are coated together with a bundling coating layer, and the coloring layer is not peeled off when the bundling coating layer is removed.

According to the present invention, there is provided a coated optical fiber unit comprising at least two coated optical fibers each of which has a coloring layer as the outermost layer and which are coated together with a bundling coating layer, wherein said bundling coating layer and said coloring layer are both treated to suppress their bonding.

In a preferred embodiment, each of the bundling coating layer and the coloring layer contains 5% by weight or less of a releasing agent based on the weight of each layer. Preferably, the releasing agent is a silicone releasing agent or a fluorine base releasing layer.

In another preferred embodiment, at least two coated optical fibers are intertwined around a tension member, or are arranged in parallel.

DETAILED DESCRIPTION OF THE INVENTION

The present invention will be explained further in detail by making reference to the accompanying drawings, which do not limit the scope of the present invention in any way.

Figure 1:
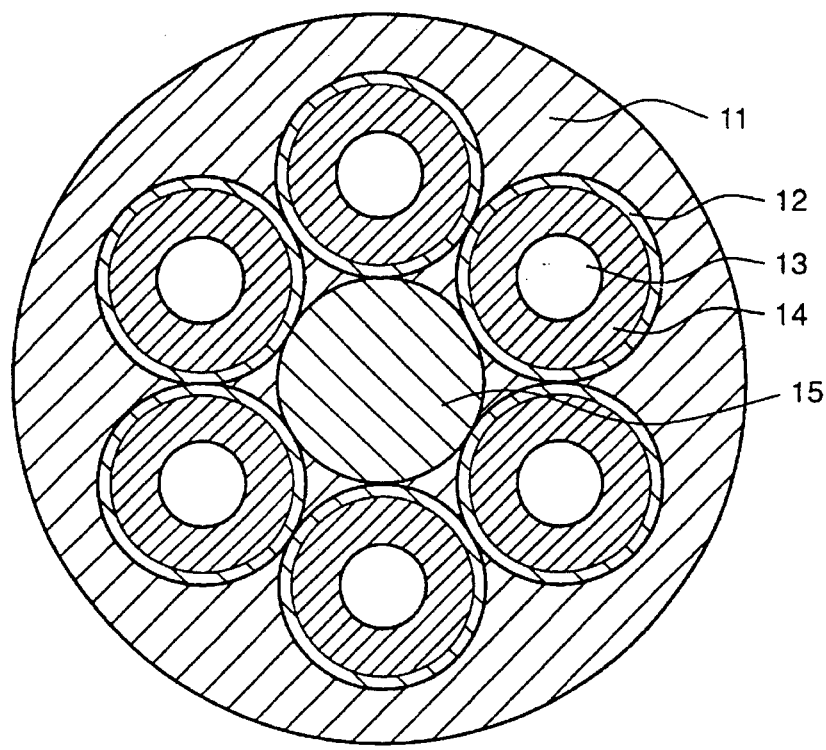
FIG. 1 is a cross sectional view of one embodiment of the coated optical fiber unit according to the present invention.

In FIG. 1, a coated optical fiber unit of the present invention comprises a tension member 15 and six coated optical fibers, each of which comprises an optical fiber 13, a coating layer 14 and a coloring layer 12 as the outermost layer, and which are intertwined around the tension member 15. The coated optical fibers are further coated with a bundling coating layer 11.

In this structure, the bond strength between the bundling coating layer 11 and the coloring layers 12 which contact the inner surface of the bundling coating layer 11 is important. When this bond strength is smaller than that between the coloring layers 12 and the protective coating layers 14, the coloring layers 12 are not peeled off when the bundling coating layer 11 is removed.

Figure 2:
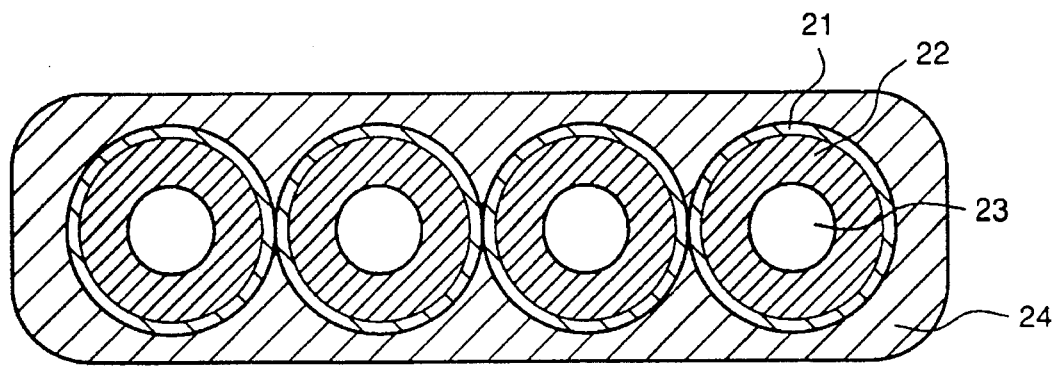
FIG. 2 is a cross sectional view of another embodiment of the coated optical fiber unit according to the present invention.

In FIG. 2., the coated optical fiber unit of the present invention comprises the coated optical fibers which are arranged in parallel and coated with a bundling coating layer 24. Each of optical fibers is coated with a protective coating layer 22 and a coloring layer 21 as the outermost layer.

In this structure, the bond strength between the bundling coating layer 24 and the coloring layers 21 which contact the inner surface of the bundling coating layer 24 is important. When this bond strength is smaller than that between the coloring layers 21 and the protective coating layers 22, the coloring layers 21 are not peeled off when the bundling coating layer 24 is removed.

The type of the releasing agent selected is not limited. Usually, a silicone resin or oil, or a fluororesin or fluoro-oil is used. Such releasing agents are well known in the art. The silicone resin or oil and the fluororesin or fluoro-oil are organic compounds having at least one silicon or fluorine atom in a molecule, and the silicone resin or fluororesin can be cured by heat or light.

A concentration of the releasing agent is usually 5% by weight or less, preferably 3 to 0.7% by weight, more preferably 2 to 0.5% by weight, based on the weight of the bundling coating layer or the coloring layer. In such concentration range of the releasing agent, the coloring layer is not removed at the same time as the removal of the bundling coating layer. Further, in this range the releasing agent which is added to the bundling coating layer and the coloring layer does not swell the resins in the layers, or cause peeling of the protective coating layer from the optical fiber.

The coloring layer is used to identify each coated optical fiber. Usually, the coloring layer is made of a resin which is colored with a solvent type ink or a UV-light curable ink, or by kneading a pigment in the resin.

Preferred examples of the resin used to form the coloring layer are thermosetting resins (e.g., silicone resins, epoxy resins, urethane resins, etc.), radiation (UV light)-curable resin (e.g., polyepoxy acrylate, polyurethane acrylate, polyester acrylate, etc.) and the like.

Preferred examples of the resin used to form the protective coating layer or the bundling coating layer are thermosetting resins (e.g., silicone resin, epoxy resin, urethane resin, etc.), actinic ray (UV light)-curable resins (e.g., polyepoxy acrylate, polyurethane acrylate, polyester acrylate, etc.), and the like.

The resin of the coating layer(s) may contain at least one additive such as a light stabilizer, an antioxidant, a UV light absorber, a lubricant, a flame retardant, a filler, a pigment, and the like, if necessary.

Thicknesses of the protective layer and the coloring layer may be the same as those employed in the conventional optical fiber unit.

A thickness of the bundling coating layer is also the same as that employed in the conventional optical fiber unit. For example, it is from 5 to 100 μm.

PREFERRED EXAMPLES OF THE INVENTION

The present invention will be illustrated by the following examples.

EXAMPLE 1

A coated optical fiber unit having the structure of FIG. 1 was produced.

Each of the coated optical fibers was produced by heating a glass preform in a drawing furnace to melt and draw it to form an optical fiber, and coating its surface with a protective resin.

As a resin of a coloring layer, a UV light-curable polyurethane acrylate resin containing a silicone oil or a fluoro-oil in varying concentrations shown in Table 1 was used, and coated around the coated optical fiber in a usual manner.

The coated optical fiber unit of FIG. 1 was produced as follows:

The six coated optical fibers each having the coloring layer were intertwined around a tension member. Then, the entire peripheral surface of the intertwined optical fibers was coated with a bundling coating resin.

Then, the peeling of the coloring layer was examined as follows:

From each of the coated optical fiber units A to K, each having six coated optical fibers, an end part (20 cm) of the bundling coating layer was removed.

Along the total removing length (20 cm×6 optical fibers= 120 cm), the total length of the coloring layers which were peeled off from the optical fibers was measured, and the degree of peeling of was evaluated.

With the coated optical fiber units, the peeling off of the coloring layers, the peeling between the optical fiber and the protective coating layer, cracking of the protective coating layer and the tackiness of the bundling protective layer surface were evaluated. The results are shown in Table 1.

TABLE 1

| Coated optical fiber unit | Releasing agent | Concentration of releasing agent in bundling coating layer (wt. %) | Concentration of releasing agent in coloring layer (wt. %) | Degree of peeling of coloring layer (cm) | Peeling between optical fiber and protective coating | Cracking of protective coating layer | Tackiness of bundling coating layer surface |
|---|---|---|---|---|---|---|---|
| A | (None) | 0 | 0 | 25 | No | No | No |
| B | Silicone oil | 10 | 0 | 3 | No | No | Slightly |
| C | ↑ | 20 | 0 | 0 | Yes | Yes | Yes |
| D | ↑ | 0 | 10 | 6 | Slightly | No | No |
| E | ↑ | 0 | 20 | 1 | Yes | Yes | Yes |
| F | ↑ | 2 | 2 | 0.5 | No | No | No |
| G | ↑ | 5 | 5 | 0 | No | No | No |
| H | Fluoro-oil | 0 | 10 | 5 | Slightly | No | No |
| I | ↑ | 10 | 0 | 5 | No | No | Slightly |
| J | ↑ | 3 | 3 | 0 | No | No | No |
| K | ↑ | 5 | 5 | 0 | No | No | No |

As seen from the results in Table 1, the degree of peeling of the coloring layer is decreased by the addition of the releasing agent to the bundling coating layer and the coloring layer.

As in the case of the coated optical fiber units C and E, when the releasing agent is added to only one of the bundling coating layer and the coloring layer, the concentration of the releasing agent should be 20% by weight or larger to prevent the peeling off of the coloring layer.

However, when the releasing agent is used in a high concentration as in the coated optical fiber units C and E, the releasing agent in the coloring layer migrates in into the resin of the inner part to swell the resin, whereby the resin is cracked, or the releasing agent migrates into the protective coating layer, whereby the protective coating layer is partly peeled off from the optical fiber.

In addition, when the releasing agent migrates onto the surface of the bundling coating layer, the surface is made tacky so that the handling of the coated optical fiber unit becomes difficult.

As seen from the results of the coated optical fiber units F, G, J and K, when the releasing agent is added to both of the bundling coating layer and the coloring layer, the peeling off of the coloring layer can be prevented even at a concentration of 5% by weight or less.

Accordingly, it is preferred to add the releasing agent to both of the bundling coating layer and the coloring layer at the concentration of 5% by weight or less each to provide the coated optical fiber unit in which the coloring layer is not removed at the same time as the removal of the bundling coating layer, and the releasing agent added to the bundling coating layer and the coloring layer does not swell the resins in the layers, or cause peeling of the protective coating layer from the optical fiber.

EXAMPLE 2

A coated optical fiber unit having the structure of FIG. 2 was produced,

The coated optical fibers were produced in the same way as in Example 1.

As a resin of a coloring layer, a UV light-curable polyurethane acrylate resin containing a silicone oil or a fluoro-oil in varying concentrations shown in Table 2 was used, and coated around the coated optical fiber.

The coated optical fiber unit of FIG. 2 was produced as follows:

The four coated optical fibers arranged in parallel and the entire periperal surface was coated with a bundling coating resin.

Then, the peeling of the coloring layer was examined as follows:

From each of the coated optical fiber units L to V, each having four coated optical fibers, an end part (20 cm) of the bundling coating layer was removed.

Along the total removing length (20 cm×4 optical fibers= 80 cm), the total length of the coloring layers which were peeled off from the optical fibers was measured, and the degree of peeling was evaluated.

With the coated optical fiber units, the peeling off of the coloring layers, the peeling between the optical fiber and the protective coating layer, cracking of the protective coating layer and the tackiness of the bundling protective layer surface were evaluated. The results are shown in Table 2.

TABLE 2

| Coated optical fiber unit | Releasing agent | Concentration of releasing agent in bundling coating layer (wt. %) | Concentration of releasing agent in coloring layer (wt. %) | Degree of peeling of coloring layer (cm) | Peeling between optical fiber and protective coating | Cracking of protective coating layer | Tackiness of bundling coating layer surface |
|---|---|---|---|---|---|---|---|
| L | (None) | 0 | 0 | 18 | No | No | No |
| M | Silicone oil | 10 | 0 | 2 | No | No | Slightly |
| N | ↑ | 20 | 0 | 0 | Yes | Yes | Yes |
| O | ↑ | 0 | 10 | 4 | Slightly | No | No |
| P | ↑ | 0 | 20 | 1 | Yes | Yes | Yes |
| Q | ↑ | 3 | 3 | 0 | No | No | No |

TABLE 2-continued

| Coated optical fiber unit | Releasing agent | Concentration of releasing agent | | Degree of peeling of coloring layer (cm) | Peeling between optical fiber and protective coating | Cracking of protective coating layer | Tackiness of bundling coating layer surface |
| --- | --- | --- | --- | --- | --- | --- | --- |
| | | in bundling coating layer (wt. %) | in coloring layer (wt. %) | | | | |
| R | ↑ | 5 | 5 | 0 | No | No | No |
| S | Fluoro-oil | 0 | 10 | 5 | Slightly | No | No |
| T | ↑ | 10 | 0 | 4 | No | No | Slightly |
| U | ↑ | 2 | 2 | 0 | No | No | No |
| V | ↑ | 5 | 5 | 0 | No | No | No |

As seen from the results in Table 2, the degree of peeling of the coloring layer is decreased by the addition of the releasing agent to the bundling coating layer and the coloring layer.

As in the case of the coated optical fiber units N and P, when the releasing agent is added to only one of the bundling coating layer and the coloring layer, the concentration of the releasing agent should be 20% by weight or larger to prevent the peeling off of the coloring layer.

However, when the releasing agent is used in a high concentration as in the coated optical fiber units N and P, the releasing agent in the coloring layer migrates in the resin of the inner part to swell the resin, whereby the resin is cracked, or the releasing agent migrates in the protective coating layer, whereby the protective coating layer is partly peeled off from the optical fiber.

In addition, when the releasing agent migrates onto the surface of the bundling coating layer, the surface is made tacky so that the handling of the coated optical fiber unit becomes difficult.

As seen from the results of the coated optical fiber units Q, R, U and V, when the releasing agent is added to both of the bundling coating layer and the coloring layer, the peeling off of the coloring layer can be prevented even at a concentration of 5% by weight or less.

Accordingly, it is preferred to add the releasing agent to both of the bundling coating layer and the coloring layer at the concentration of 5% by weight or less each. In the resultant coated optical fiber unit, the coloring layer is not removed at the same time as the removal of the bundling coating layer, and the releasing agent added to the bundling coating layer and the coloring layer does not swell the resins in the layers, or cause peeling of the protective coating layer from the optical fiber.

What is claimed is:

1. A coated optical fiber unit comprising at least two coated optical fibers, wherein each of said coated optical fibers has a coloring layer as the outermost layer and is coated with a bundling coating layer, wherein said coloring layer contains a first releasing agent in an amount not greater than 5% by weight based on the weight of said coloring layer, and further wherein said bundling coating layer contains a second releasing agent in an amount not greater than 5% by weight based on the weight of said bundling coating layer.

2. The coated optical fiber unit according to claim 1, wherein said first releasing agent is at least one material selected from the group consisting of silicone releasing agents and fluorine base releasing agents.

3. The coated optical fiber unit according to claim 1, which further comprises a tension member, such that said coated optical fibers are intertwined around said tension member.

4. The coated optical fiber unit according to claim 1, wherein said coated optical fibers are substantially parallel to one another.

5. The coated optical fiber unit according to claim 1, wherein said second releasing agent is at least one material selected from the group consisting of silicone releasing agents and fluorine base releasing agents.

6. The coated optical fiber unit according to claim 1, wherein said coloring layer contains said first releasing agent in an amount ranging from 3 to 0.7% by weight based on the weight of said coloring layer.

7. The coated optical fiber unit according to claim 1, wherein said coloring layer contains said first releasing agent in an amount ranging from 2 to 0.5% by weight based on the weight of said coloring layer.

8. The coated optical fiber unit according to claim 1, wherein said bundling coating layer contains said second releasing agent in an amount ranging from 3 to 0.7% by weight based on the weight of said bundling coating layer.

9. The coated optical fiber unit according to claim 1, wherein said bundling coating layer contains said second releasing agent in an amount ranging from 2 to 0.5% by weight based on the weight of said bundling coating layer.

* * * * *